July 29, 1930.  G. D. HASKELL  1,771,847
AIRPLANE
Filed Sept. 16, 1929
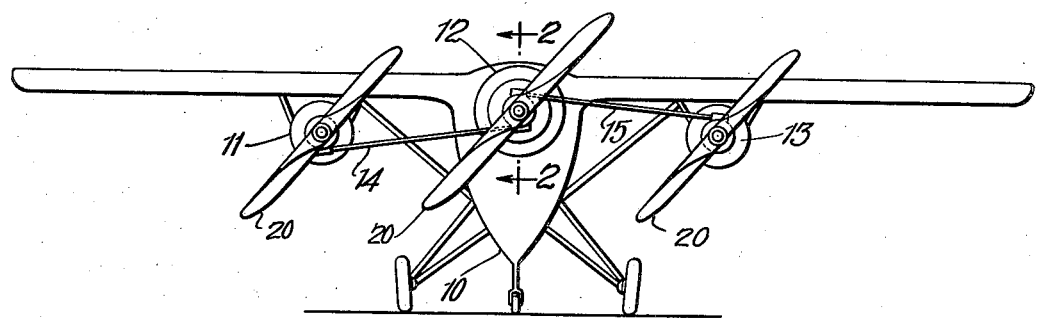
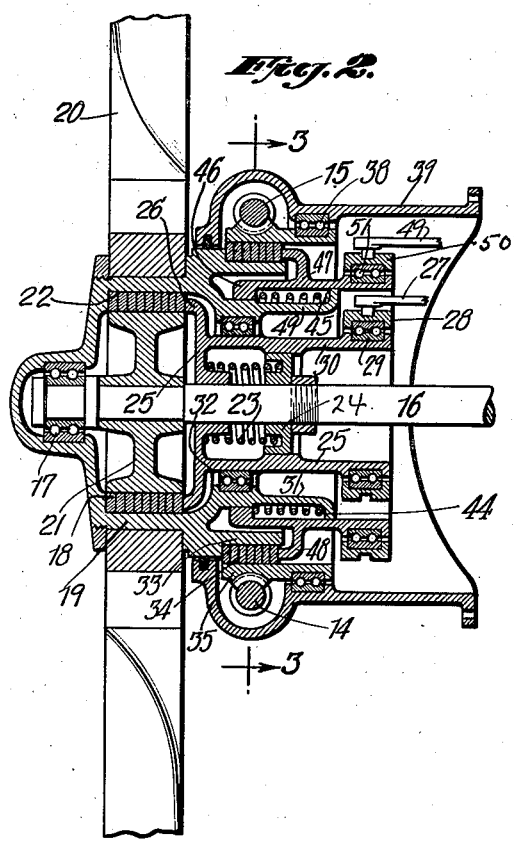
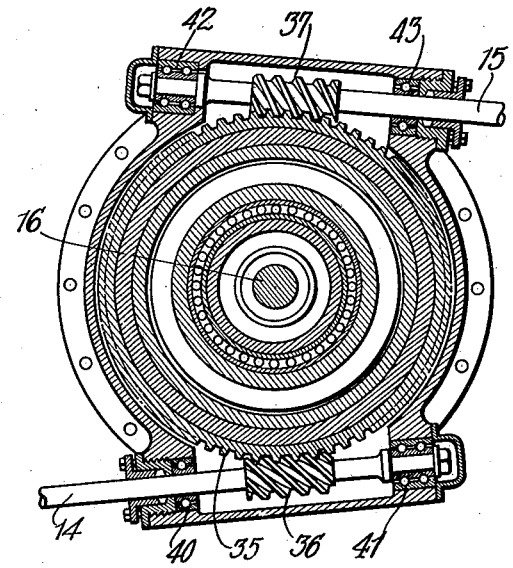
Inventor
GEORGE D. HASKELL.
Attorneys Patented July 29, 1930

1,771,847

UNITED STATES PATENT OFFICE

GEORGE D. HASKELL, OF BOSTON, MASSACHUSETTS, ASSIGNOR TO BAUSH MACHINE TOOL COMPANY, OF SPRINGFIELD, MASSACHUSETTS, A CORPORATION OF MASSACHUSETTS

AIRPLANE

Application filed September 16, 1929. Serial No. 392,806.

This invention relates to aircraft and particularly to multiple motored airplanes in which the driving or tractive power is supplied by sets of engines and propellers in spaced relation to each other.

In airplanes of the above type the failure of one or more of the engines is a serious matter and may be dangerous, due to the unbalanced tractive or propelling power that is thus brought about. Airplane engines usually have an excess power over that required for their individual propellers or sets of propellers but, having been heretofore applicable only to their respective propellers, this excess power has not been available to overcome the unbalanced driving power of the airplane as a whole when one or more of the other engines becomes inactive or "dead."

An object of the present invention is to provide a means for operating at will the propellers of one or more engines from a common engine or propellers simply mounted on bearings distant from engine or central power plant.

Other objects are to provide means whereby a propeller may be disenaged from its respective driving engine and the engine or the propeller operated independently of the other; to provide a means whereby a propeller may be disengaged from its respective engine and driven by another engine, and to provide a mechanism whereby the above changes in driving arrangements may be easily and quickly effected from a location at a distance from the engine and propeller and may be accomplished while the engines are in action and the airplane is in flight.

Other objects will be apparent from the following description of an embodiment of the invention.

The various features of the invention are illustrated in the accompanying drawings, in which:

Fig. 1 is a front elevation of a tri-motored airplane embodying a preferred form of the invention.

Fig. 2 is a vertical sectional view, taken on line 2—2 of Fig. 1, of a portion of a propeller and of a means for connecting the propeller to its respective engine or to other engines of the airplane, and Fig. 3 is a vertical sectional view taken on line 3—3 of Fig. 2.

In the present invention an inter-connecting transmission mechanism is provided to which each engine and its propeller may be connected at will or to which they may be clutched either simultaneously or alternatively. Thus, in the event that one engine should become dead or inoperative in flight, it may be disconnected from its respective propeller, the propeller may then be connected to the transmission mechanism and the transmission mechanism connected to a neighboring engine and propeller, and both propellers operated from a common engine. When the airplane is provided with three or more engines and propeller units, it will be understood that certain of the units, preferably the inner or central units, are provided with transmission means to two or more of the other units.

In the accompanying drawings a tri-motored airplane 10 having three engines and propeller units 11, 12 and 13 is shown by way of example. Each unit is provided with a transmission means to which its engine and propeller may be connected separately or as a unit, and the transmission mechanism of the unit 12 is connected to the units 11 and 13 by means of connecting shafts 14 and 15, respectively, or equivalent means. It will be understood that when several units are offset or not in alignment, suitable universal joints may be used, and that in cases in which the engines and propellers are not aligned, the propellers being, for example, in the upper part of the plane and the engines below, suitable connections are provided.

The transmission and clutching mechanism for each of the engine and propeller units is similar to those of the others except that the transmission mechanism of the central unit is connected to both of the shafts 14 and 15. As shown in Figs. 2 and 3 the crank shaft 16 of the engine, or equivalent driving shaft when the engine is offset from the propeller, is provided at its forward end with a ball bearing 17 on which is mounted the forward wall 18 of a housing 19 that extends rearwardly from the bearing 17 and on which is rigidly mounted the hub of the propeller 20. Keyed onto the shaft 16 is an inner clutch member 21 of the multiple disc type, the discs of which are movable into engagement with discs of an outer clutch element 22 secured to the inner surface of the housing 19. When the engines are all running under normal condition, the discs of the inner clutch member 21 are pressed into engagement with those of the outer clutch member by means of a helical spring 23 encircling the shaft 16 and confined between a ring 24 fixed on the shaft and a disc 25 slidably mounted on the shaft 16, and having a forwardly projecting peripheral flange 26 that engages the clutch discs. When the engine of a propeller unit is to be disconnected from its propeller for any cause, the disc 25 is drawn rearwardly against the action of the spring 23 by means of a manually slidable rod or linkage connection 27 that extends to levers or other devices in the cockpit, and is connected through a grooved ring 28 and ball bearing 29 on a cylindrical extension 30 integrally mounted on the rear face of the disc 25.

The housing 19 is extended rearwardly to form an inner cylindrical shell 31 which is rotatably supported on the tubular extension 25 by means of a ball bearing 32 slidable longitudinally of the shell 31. The housing 19 is also provided with an outer cylindrical extension 33 on which are mounted the inner discs of a multiple disc clutch 34, the outer discs of which are mounted on the inner surface of a worm gear 35 that meshes with worms 36 and 37 on the shafts 14 and 15, respectively, as shown in Figs. 2 and 3. The worm wheel 35 is journaled or rotatably mounted in ball bearings 38 in a stationary housing 39 mounted on the forward end of the engine casing, not shown. The shafts 14 and 15 are journaled transversely to the shaft 16 by means of bearings 40 and 41 and 42 and 43, respectively, mounted on the housing 39. When the propeller 20 is to be clutched to the worm gear 35, the discs of the clutch 34 are pressed into engagement by means of a spring 44 confined between an outwardly extending flange 45 at the rear edge of the shell 31, and an inwardly projecting flange 46 on a cylindrical shell 47 on the outer surface of which is a forwardly projecting disc engaging flange 48 which is pressed by the action of the spring 44 forwardly against the discs of the clutch 34. When the propeller 20 is to be disengaged from the worm gear 35, the shell 47 and the flange 48 are withdrawn rearwardly against the action of the spring 44 by means of a rod 49 extending from linkages or moving levers in the cockpit, not shown, and engaging a peripheral groove in a circular yoke or ring 50 rotatably engaging the shell 47 through a ball bearing 51.

When the propellers 20 of each of the engines 11, 12 and 13 are to be driven by their respective engines, the rod 27 of each engine is retarded or advanced to permit the spring 23 to press the plate 25 forwardly and, acting through the flange 26, to press the discs 21 and 22 of the propeller clutch into engagement. The propeller 20, clutch plates 18 and 22, disc 25 and shell 30 and housing 19 then rotate with the engine shaft 16, the rods 27 and 49, the worm gear 35 and the housing 39 remaining stationary. The rod 49 of each engine may also be advanced to permit the spring 44 to push forwardly the rod 47 and flange 48 to cause the plates of clutch 34 to engage, whereby the worm gear 35 of each engine is then clutched to the housing 19 and rotates with the shaft 16 and propeller 20 and causing the connecting shafts 14 and 15 to rotate in unison. This is, however, not necessary.

When either of the engines 11, 12 or 13 goes "dead" or stops from any cause and its shaft 16 thereupon becomes stationary, the rod 27 is withdrawn against the action of the spring 23 thereby drawing rearwardly the shell 30, plate 25 and flange 26, and releasing the clutch plates 21 and 22 and thus disconnecting the propeller 20 of the stopped engine from the shaft 16. The rod 49 is then released enabling the plates of clutch 34 to engage and connect the housing 19 and propeller 20 to the worm gear 35 and thus bring the propeller 20 into driving relation with the shafts 14 or 15, or both. By similarly causing the engagement of the plates of the clutches 34 of one or more of the other active engines and propellers, the propeller 20 of the dead or stalled engine is driven from the other operating engine or engines. In this way all of the propellers of the aircraft, or any pair of them, may be driven simultaneously from a single engine or from engines less than the total number without driving the dead or stalled engine.

In the event also, that one of the engines is to be tested, the clutch plates 21 and 22 may be disengaged as described above and the engine run without rotating its propeller.

The above invention, therefore, provides a multiple engine and propeller mechanism of great flexibility enabling the propellers to be operated independently by their individual engines, or to be driven at will simultaneously with uniform speeds from all or less than all of the engines. It enables the engines, or any one of them, to be disengaged from their respective propellers for testing or other purposes. All of these conditions of operation may be easily and quickly attained from the cockpit of the airplane without shock and while one or more of the engines are running.

While a multiple type friction clutch has been described by way of example for connecting the engine and propeller to the transmission and to each other, it will be understood that other types of clutches, such as a cone clutch may be used. Similarly, other types of transmissions, such as chain, may be substituted for the shafts 14 and 15, if desired.

It will also be understood that when there is a speed modifying device between the engine and the propeller, the shaft 16 may be driven by the speed modifying device rather than forming an extension of the crank shaft.

It will be further understood that the propellers 20 may be of any desired type, or in any position, and that if desired certain groups of propellers may be arranged to be driven from a single engine.

Having described my invention, what I claim and desire to secure by Letters Patent is:

1. In multiple motored aircraft, a plurality of engine and propeller sets, said sets comprising an engine shaft, a propeller having a housing encircling and journaled on the end portion of said shaft, and a clutch between said housing and said shaft, interconnected transmission means between said sets, said transmission means comprising a rotatable element centered on said shaft, and a clutch between said housing and said rotatable element.

2. In multiple motored aircraft, a plurality of engine and propeller sets, said sets comprising an engine shaft, a propeller having a housing encircling and journaled on the end portion of said shaft, a clutch between said housing and said shaft, inter-connected transmission means between said sets, said transmission means comprising a worm gear centered on said shaft, and a worm shaft connecting the worms of said sets, and a clutch between said housing and said worm shaft.

3. In multiple motored aircraft, a plurality of engine and propeller sets, said sets comprising an engine shaft, a propeller having a housing encircling and journaled on the end portion of said shaft, a clutch between said housing and said shaft; interconnected transmission means between said sets, said transmission means comprising a worm gear centered on said shaft, a worm shaft connecting the worms of said sets, a clutch between said housing and said worm shaft, an enclosing housing for each worm and worm gear, and supporting bearings between said enclosing housing, said worm gear, said propeller housing and said shaft.

4. In multiple motored aircraft, a plurality of engine and propeller sets, said sets comprising an engine shaft, a propeller having a housing encircling and journaled on the end portion of said shaft, a clutch between said housing and said shaft, inter-connected transmission means between said sets, said transmission means comprising a worm gear transmission means comprising a worm gear centered on said shaft, a worm shaft connecting the worms of said sets, a clutch between said housing and said worm shaft, means for connecting said clutch operating mechanism to a distant control, and a bearing connection between said connecting means and said clutch means.

In witness whereof, I have hereunto signed my name.

GEORGE D. HASKELL.